(12) United States Patent
Steinmann

(10) Patent No.: US 7,826,385 B2
(45) Date of Patent: Nov. 2, 2010

(54) METHOD FOR THE ACCEPTANCE OF DEVICES, AN ARRANGEMENT WHICH CAN BE USED FOR THIS PURPOSE, AND EQUIPMENT

(75) Inventor: Matthias Steinmann, Konolfingen (CH)

(73) Assignee: GFK Telecontrol AG, Hergiswil (CH)

( * ) Notice: Subject to any disclaimer, the term of this patent is extended or adjusted under 35 U.S.C. 154(b) by 984 days.

(21) Appl. No.: 10/570,301

(22) PCT Filed: Sep. 2, 2004

(86) PCT No.: PCT/CH2004/000554

§ 371 (c)(1),
(2), (4) Date: Dec. 22, 2006

(87) PCT Pub. No.: WO2005/022421

PCT Pub. Date: Mar. 10, 2005

(65) Prior Publication Data

US 2007/0165553 A1    Jul. 19, 2007

(30) Foreign Application Priority Data

Sep. 2, 2003   (EP)   .................................. 03405636

(51) Int. Cl.
   *H04J 1/16*   (2006.01)
(52) U.S. Cl. ..................... 370/252; 370/315
(58) Field of Classification Search ............. None
   See application file for complete search history.

(56) References Cited

U.S. PATENT DOCUMENTS 4,973,952 A    11/1990    Malec et al.

(Continued)

FOREIGN PATENT DOCUMENTS

EP    0 408 348 A2    1/1991

(Continued)

OTHER PUBLICATIONS

Wer hat's gesehen?—Die Forscher die Plakatnutzung messen wollen, Online!, Jun. 29, 2004, Seite 1-3, XP02306851, Zurich. URL: http://www.nzz.ch/2004/06/29/hx/page-article90EME.html.

(Continued)

*Primary Examiner*—Chirag G Shah
*Assistant Examiner*—Daniel Mitchell
(74) *Attorney, Agent, or Firm*—Birch, Stewart, Kolasch & Birch, LLP

(57) ABSTRACT

Disclosed is an arrangement for determining a chronological acceptance of spaced-apart devices, comprising at least one transmitter unit which is disposed on each device and from which a signal that identifies said device and has a predefined range can be transmitted. Several personal apparatuses are provided that are to be carried by one respective person and are fitted with a receiver for the signals and a device memory for storing data contents of the emitted signals during a given interval. The range of each transmitter unit defines a respective transmission range. The transmission range and a receive sensitivity of the receiver are adjusted to each other in such a way that no data can be received if the device is located outside a typical zone of attention or perception of humans relative to the personal apparatus carried by the person.

20 Claims, 5 Drawing Sheets

U.S. PATENT DOCUMENTS

| | | |
|---|---|---|
| 5,023,929 A | 6/1991 | Call |
| 6,477,117 B1 * | 11/2002 | Narayanaswami et al. .. 368/251 |
| 2005/0035857 A1 * | 2/2005 | Zhang et al. ........... 340/539.13 |

FOREIGN PATENT DOCUMENTS

| | | |
|---|---|---|
| EP | 1 085 440 A2 | 3/2001 |
| EP | 1 094 417 A2 | 4/2001 |
| EP | 0 598 682 B1 | 7/2003 |
| JP | 2002-269508 A | 9/2002 |
| WO | WO-00/72289 A1 | 11/2000 |

OTHER PUBLICATIONS

Esomar Event Progamme Measurement 2004, Online! Seite 1-10, XP002306852, URL:http://www.esomar.org/esomar/show/id-120262.

Mediawatch Begeistert an Wletkongress, Online! XP002306944, URL:http://www.ihagk.ch/gfk/EMN-Essenz/Marktforschung238.htm.

* cited by examiner

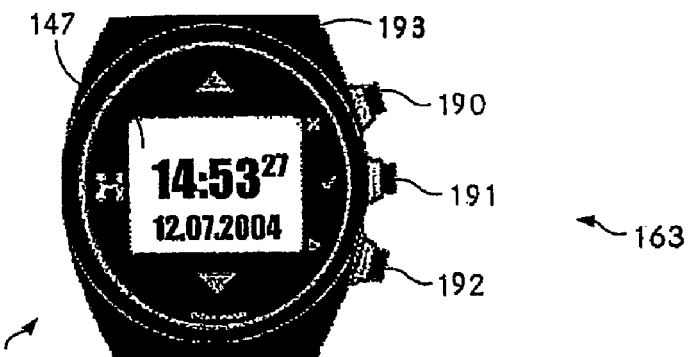
Fig. 5
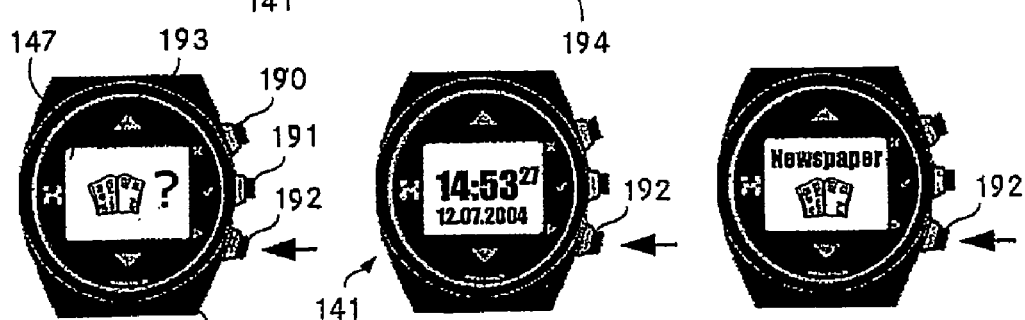
Fig. 6A   Fig. 6B   Fig. 6C
  
Fig. 6D   Fig. 6E   Fig. 6F
 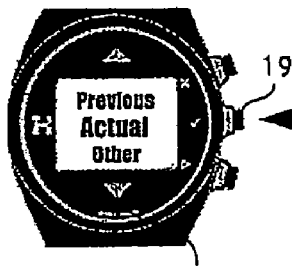 
Fig. 6G   Fig. 6H   Fig. 6I

METHOD FOR THE ACCEPTANCE OF DEVICES, AN ARRANGEMENT WHICH CAN BE USED FOR THIS PURPOSE, AND EQUIPMENT

TECHNICAL FIELD

The invention relates to a method for determining an acceptance level of devices as claimed in patent claim 1, an arrangement for carrying out the method as claimed in patent claim 7, a personal apparatus as claimed in patent claim 10, and a transmitter unit of the arrangement as claimed in patent claim 14.

PRIOR ART

An acceptance level, in particular a chronological acceptance level, is understood to mean whether devices act on a viewer or user, in particular how long they act on him, i.e. how long a device such as a poster or a shop window is in the field of vision of a viewer or how long a user is located in a facility such as a restaurant, a department of a store or in a means of transportation. This information is a measure of whether the device acts at all on the user, and how strongly it acts on him, is perceived by him and can, for example, prompt or request him to make a purchase, to make use of something or to view something.

Attempts have been made to determine purchasing behavior, for example, by outputting customer cards which were to be presented at the cash desk when making a purchase. The purchased goods were then assigned to the card owner's data and processed in a central computer and stored. The intention was to determine the purchasing habits from this. The desire here was, for example, to optimize a goods' range and/or, for example, to send advertising material in a targeted fashion to the respective person. However, a precise purchasing profile can be produced only in so far as the customer card has been presented.

PRESENTATION OF THE INVENTION

Object

The object of the invention is to provide a method and equipment which can be used for this purpose, which permit an acceptance level of devices and thus their effect on uninvolved persons as well as persons who are concerned with them and persons who possibly use them.

Solution

The means of achieving the object are obtained according to the method by means of the features of patent claim 1. According to the device, the object is achieved by means of the arrangement defined in patent claim 7, which arrangement has, inter alia, a personal apparatus which is defined in patent claim 10, and a transmitter unit which is defined in patent claim 14.

According to the invention, an acceptance level of devices acting on persons is determined in that an electromagnetic identification signal is emitted with a predefined range by each of these devices. This can be done by arranging, on at least one of the devices, a transmitter unit which can emit the electromagnetic signal. The transmission power and the antenna used are set or selected in such a way that the predefined range is obtained at the location of the device under the given environmental conditions. The setting of the transmission power can be based, for example, on previously executed model calculations or else on a calibration which is performed once the transmitter device has been installed. The instantaneous data content of the identification signal is received by a personal apparatus which is carried or worn by a person if the person is located within a transmission area which is defined by the respective range. The data content is also stored in an apparatus memory of the personal apparatus. The transmission area and the reception sensitivity of the personal apparatus are matched to one another in such a way that data reception is not possible if the device is located outside a typical range of human attention or perception with respect to the personal apparatus which is being carried or worn by the person.

As a rule, all the devices are equipped with a transmitter, but do not have to be. Corresponding data can also be input into the personal apparatus by means of the "question-response interaction" described below.

A human range of attention or perception of a device is understood to be the range in which a person can be located in order to perceive or recognize the typical properties of a device or to use or process parts of the device. This term will be clarified by a number of examples below. The range of attention or perception of a shop window is, for example, the viewing range in which objects which are on show and their labels (for example price labels) can still be recognized. As a rule, a distance of one to three meters from the glass pane of the shop window is meant. If an advertisement on an illuminated advertising pillar is considered, a distance of one to two meters is assumed. If the habits of use in public means of transportation are determined, the range of attention or perception is restricted to the inside of the vehicle. If an automatic machine is activated, it is necessary to have contact with it. However, relatively large ranges of approximately 25 meters for pedestrians and of approximately 50 meters for persons moving in vehicles can also be selected.

Determining a level of acceptance with interaction with persons can impinge on their private sphere, which is to be protected. It has to be necessary to read out the stored data for subsequent evaluation. So that said data cannot be interpreted by everyone it is encrypted. A simple method of encryption which also saves memory space, takes the form of storing the signals from a spatial monitored area which contains a plurality of devices during a predefined time period in a control center as time period device signals. The data contents, stored in the apparatus memory of the personal apparatus over the time period, of the identification signals are transmitted later to the control center and read out to form coincidences with the time period signals stored there, i.e. the transmitted signals are correlated with a plurality of time intervals of the various time period signals stored in the control center until a maximum degree of coincidence occurs. It is possible to determine from this both the signal received from the personal apparatus and the time of reception. The coincidences which are determined can subsequently be processed by, for example, firstly processing the individual coincidences to form information about the use behavior, i.e. it is determined when and for how long the user uses which devices or media. Static evaluation of the information over a number of users can be carried out as the next step in order, for example, to determine the switch-on rate of a television transmission.

Further types of encryption are specified in the detailed description.

In order to avoid misinterpretations, ambient information can also be recorded at the same time. Noise, light intensities, ambient temperatures etc. may be used as ambient information.

Only the identification signals for the data contents emitted by the respective device could then be stored. However, the respective device can emit both its identification signal and also a question catalog with one or more questions which are then replied to by means of input means on the personal apparatus. The question catalog can also be stored in the personal apparatus. The replies which are entered are stored in the apparatus memory of the personal apparatus. However, the identification signal can also contain the precise location designation of the respective device.

The question catalog can, if it is not automatically transferred, relate to the location of use of a medium, in particular of the radio, of the television or of a print medium. In this case, a selection of various locations is preferably offered to the user, for example "at home", "in the car", "in the office", "in a restaurant" etc. from which he can select the current location. In order to make the selection easier, the various locations can be assigned different symbols (for example a house, a car, a desk, knife and fork etc.). In the simplest case the selection can be made by repeated pressing of a single push-button key.

The information registered by the input means on the personal apparatus can also relate to the time and/or the duration of use of a print medium, that is to say a newspaper, a magazine, periodical or a book. In this case, the user again preferably chooses the type, title and/or issue of the medium from a selection before he starts reading it. In this way, the medium used and the time of use are determined. At the end of the reading, the user again activates one of the input means so that the duration of the use can also be determined.

The question catalog can also relate to qualitative details about the use of the medium or of one of the devices, that is to say for example the satisfaction level after a visit to a restaurant, a store or a cinema, specific questions on the content of print media or of radio or television broadcasts, satisfaction level with the music station etc.

In all cases, by activating the input means, the response to the question catalog can be carried out independently of, and simultaneously with, the reception and storage of the electromagnetic identification signal, i.e. the user can continue the input process unimpeded even if the personal apparatus receives and/or processes a signal. For this purpose, the personal apparatus is designed in such a way that it can simultaneously interrogate the input means, process the information acquired therefrom and receive and process the electromagnetic signal. At the same time, if appropriate a display on the personal apparatus can also be updated.

However, there may also be input means present which receive additional signals. Additional signals may be ambient signals, for example acoustic ambient information. In particular, a radio station or a soundtrack of a television station (or short excerpts therefrom) can be received and stored in the apparatus memory, if appropriate after encryption, encoding and/or compression of the received signals. The reception and storage of the ambient signals is carried out independently of the reception of the data contents of the electromagnet identification signals, and the two signal types can be processed simultaneously. The ambient information can also be stored in a control center as time period device signals so that later coincidence formation with the ambient information which is firstly stored in the personal apparatus and transmitted later to the control center can take place.

Various information items can be determined from the coincidence formation with the stored ambient information. In this way, it is possible to infer noises, the brightness or temperature at the location of use (inside, outside, at home, in public etc.).

If different information items are acquired simultaneously, i.e. the data contents of the identification signal, information from the input means and ambient information, and stored together, various aspects of the use of media or devices, in particular locations, times, periods of use or qualitative details, can be determined simultaneously. The fact that a plurality of devices, a plurality of media or media and devices are used simultaneously becomes clear. In the case of devices, for example the location and the time information are sensed by means of the identification signals, while the qualitative information is sensed by manual inputs at the personal apparatus. In the case of radio or television, the transmitter, the time and the duration are determined by acoustic ambient information, while the location is determined by identification signals from nearby devices and/or manual inputs and/or ambient information. In the case of print media, in turn chronological details are determined, for example by manual inputs by the user, while the determination of location is carried out again by identification signals from nearby devices and/or manual inputs and/or ambient information, depending on availability. Of course, in the case of certain devices or media it is possible to dispense with the determination of some of the information. The various information items which can be registered can moreover be registered in a subsidiary way, i.e. for the purpose of determining a location an attempt is first made to receive an identification signal from a nearby device. If this is not successful, the ambient information (acoustic, temperature, brightness) is registered and stored. In addition (or in certain cases), the user can be requested to manually input further information.

The method according to the invention and the corresponding devices thus permit the simultaneous registration of various media and devices by means of a single apparatus which is carried or worn by a person. The data is registered in real time, and the evaluation can in principle be carried out directly after the registration of the data.

In addition to the acoustic ambient information, the temperature and the brightness, it is, however, also possible to receive a second signal or a plurality of signals in addition to the data contents of the identification signal. Exemplary embodiments of this can be found in the detailed description.

Any device can then emit signals from itself. The personal apparatus can however also initiate a device to transmit signals. Such a method will be mainly used when energy is to be saved in the device. As a rule, it would be more advantageous if the personal apparatus were to emit an initiation pulse, but many persons are disinclined to wear or carry a personal apparatus which often emits an electromagnetic radiation.

Execution of the determination of an acceptance level from devices which are spaced apart from one another in a monitored area, which may be a part of a town, a village or an entire city, is achieved according to the invention by an arrangement which has a plurality of devices with transmitter units in the monitored area, and a plurality of persons each wear or carry a personal apparatus with apparatus memory for storing data. The transmitter units and the personal apparatuses have the properties already mentioned above.

An arrangement composed of a plurality of personal apparatuses and at least one transmitter on each of the devices is ready for operation. The transmitters are designed in such a way that they emit a signal which characterizes the respective device and which may also change over time. However, an additional control center will preferably also be used in an arrangement. This control center has a central memory in which the data records of the signals emitted by the devices or their data contents can be stored over a predefined time period. In addition, the control center has a reading unit with which the apparatus memory can be read out, and a correlation unit with which the read-out data signals of the apparatus memory can be determined and evaluated with the data records of the central memory in a coincidence routine. The use of a control center permits data compression and thus provides security against unauthorized reading out of the data contents stored in the personal apparatus. An encryption (enciphering) of the data contents is possible.

It is then possible to provide a control center which evaluates a series of personal apparatuses. Respective personal apparatuses are then read out to the control center. However, a plurality of fixed control centers may also be provided, for example in every household which has at least one person who wears or carries a personal apparatus. This "house station" ("docking station") can then, for example, read out the data from the personal apparatus and transfer it to a central unit via the telephone network, for example.

The transmitter or the devices which are selected in such a way are located at different locations in a monitored area. If groups of persons are selected according to particular properties or if just one acceptance level over a cross section of the population is to be determined, it is possible to determine how often and for how long specific devices have been visited, considered or used, from the data stored in the personal apparatuses. In this way a means is provided for determining, inter alia, how successful advertising is, how frequently public means of transportation are used, and between which stops; it is also possible to determine, for example, what acts as a means of capturing attention in shop windows or on advertising billboards.

The personal apparatus is worn or carried by the respective person. The apparatus is preferably designed as a wrist watch so that it is not too conspicuous and so that it is also of benefit to the person. If the respective person wears a personal apparatus on each arm, instead of a single personal apparatus, it is possible to determine, on the basis of interference measurements, how the person is oriented with respect to the device. If for example, he is standing with his back to it, visual attraction or viewing of an advertisement can be ruled out.

If the data is registered with a certain clock time, a data compression is possible. There are then typical viewing or presence times of different lengths. In front of a shop window for example, a presence time of a minute might already be long enough. In a bus, the time present is already significantly longer, and even longer in a cinema or a restaurant. In order then to determine reasonable details about a device acting on a person, the clock time used for storage can be made variable. Devices which require a short "action time" should thus bring about a higher clock frequency (shorter time between the individual measurements); presence-specific devices will then bring about a lower clock frequency (a longer time between the measurements). With the signal which is emitted by the transmitter of the device it is thus possible to emit a code for a corresponding clock time, which then correspondingly switches over the clock transmitter in the personal apparatus.

Further advantageous embodiments and feature combinations of the invention emerge from the following detailed description and the entirety of the patent claims.

BRIEF DESCRIPTION OF THE DRAWINGS

The drawings which are used to explain the exemplary embodiment show

FIG. 5 an external view of the personal apparatus; FIGS. 6A-M various views of the display of the personal apparatus during the registration of the use of print media;

Basically, identical parts and elements are provided with the same reference symbols in the figures.

WAYS OF EMBODYING THE INVENTION

Figure 1:
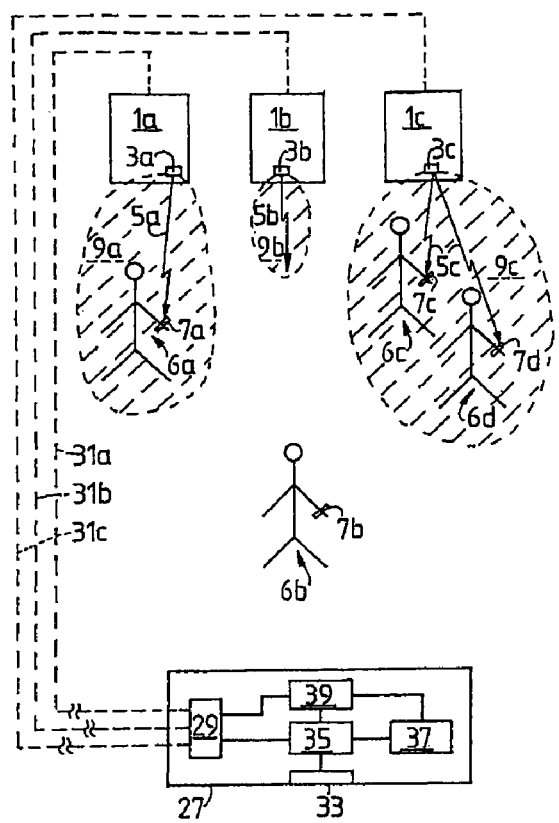
FIG. 1 a schematic illustration of an embodiment variant of an arrangement for determining the behavior of persons over time.

The exemplary embodiment of an arrangement according to the invention which is illustrated in FIG. 1 serves the purpose of determining the acceptance level over time of devices 1a to 1c which are spaced apart from one another. Devices may be shop windows, posters, cinemas, stores, museums, tram stations and bus stations etc whose acceptance level with the population is to be determined.

Acceptance is understood to be, for example, which sections of the population look at which shop windows with which content. Which sections of the population go to the cinema at what times and see which films. Which museums are visited and what is looked at. Which buses, trams are used from where to where and when.

At least one transmitter unit 3a to 3c is arranged on each unit 1a to 1c whose acceptance level is to be determined. The transmitter unit 3a to 3c emits an electromagnetic identification signal 5a to 5c which identifies this device and has a range, generally a short one, which is predefined by the corresponding transmission power. Each transmitter unit 3a to 3c has a uniquely defined serial number which is formed by a 32-bit code. This permits more than 4 billion units to be differentiated. Each transmitter unit also transmits an 8-bit code which can be used to transmit further device-specific information. For example, different codes for advertising, for prefilm and for the main film can be emitted in a cinema so that later it is possible to differentiate selectively between these parts of the program when making an evaluation. The transmitter units 3a to 3c transmit the serial numbers identifying them all at respectively predefined times (burst).

Each of these identification signals 5a to 5c can be received by a receiver of a personal apparatus 7a to 7d to be worn or carried by a person 6a to 6d if the person or his personal apparatus is located in the transmission area 9a, 9b or 9c of one of the transmitter units 3a to 3c. The person 6a in FIG. 1 is located with his personal apparatus 7a in the transmission area 9a, and the two persons 6c and 6d are located with their personal apparatuses 7c and 7d in the transmission area 9c. The person 6b with his personal apparatus 7b is not located in a transmission area.

Figure 2:
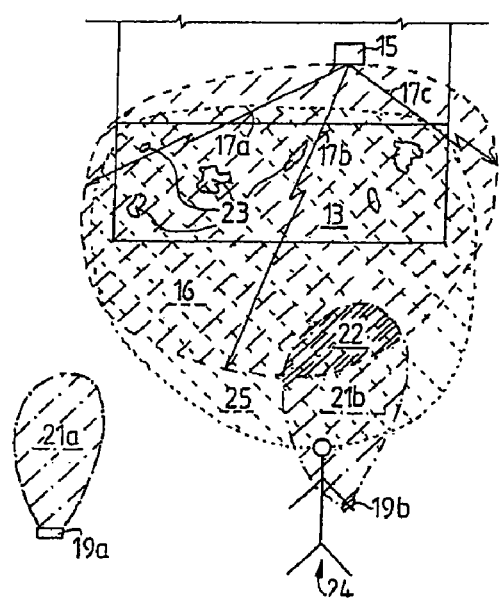
FIG. 2 a schematic illustration of the relationship of the range of attention or perception, transmission area and reception area.

The range of each transmitter unit and the sensitivity of the respective receivers of the personal apparatuses are matched to one another in such a way that data reception is not possible if the device is located outside a typical range of human attention or perception with respect to the personal apparatus which is being worn or carried by the person. This fact is explained in FIG. 2. In FIG. 2, a shop window 13 is illustrated schematically in a way which is analogous to the devices 1a to 1d. Behind the shop window 13 a transmitter unit 15 which is of analogous design to the transmitter units 3a to 3c is arranged. The transmitter unit 15 emits electromagnetic identification signals in to a lobe-like transmission area 16 which is analogous to the transmission areas 9a to 9c. In the transmission area 16, the ranges 17a to 17c are thus different depending on the direction of the broadcast. Each receiver 19a and 19b which is of analogous design to the receivers then has a spatial reception area which is defined by its sensitivity, identification signals being received whenever the reception area and transmission area including a common area, the overlapping area 22. In FIG. 2, the two reception areas 21a and 21b of the two receivers 19a and 19b are illustrated.

In order to be able to recognize and assess, for example, the exhibits 23 in a shop window 13, the viewer, here the person 24 must stand so close that this is also possible. The area in which the person can recognize and assess everything at this distance is defined as the range of human attention or perception. The transmission area 16 and the reception sensitivity 21b are then matched to one another in such a way that the item to be viewed, here the exhibits 23, lie within the range 25 of attention or perception. As stated below, the transmission area 16 does not necessarily need to start from the respective device. The device can also be the receiver. The same applies to the reception sensitivity.

The area 25 differs from case to case. However, it is possible to assume that short-sighted persons and far-sighted persons wear sight-correcting glasses; for the sake of simplification a typical range of human attention or perception will therefore be used. If necessary it is however possible also to adjust the receiver 19a or 19b individually to the sight, or if the signals are auditory signals, to the individual hearing.

The different identification signal data records which are stored in an apparatus memory 55 mentioned below are read out later in order to find out what the respective person was interested in. Such an evaluation over a representative cross section of the population or merely over a very large number of persons of a location provides information on a wide variety of questions of which only a small selection is listed below:

Which advertising means are the most suitable, where they should be provided, and what should be shown.
Which roads and routes are used with what frequency and which sides of the road are used.
Which connections of public means of transportation are used when and how often.
Which shop windows, stores, local shops etc are visited when and how often.

The arrangement of personal apparatuses 7a to 7d and transmitters 3a to 3c which is described above is ready for operation. However, the system will preferably be assigned a control center 27 with a central memory 29, which is however not at all compulsory. The central memory 29 is connected to the transmitter units 3a to 3c of the units 1a to 1c by signals. The connection can be made via lines 31a to 31c (for example telephone network) as shown in FIG. 1. However, it can also be done by means of radio. It is also possible to send data carriers to the control center 27. The control center 27 also has a reading unit 33 with which the apparatus memory 26 of each personal apparatus 7a to 7d can be read out via an interface 38, and a correlation unit 35 with which the read-out data signals of the apparatus memory with the data records of the central memory 29 can be determined in a coincidence routine and evaluated in an evaluation unit 37.

Figure 3:
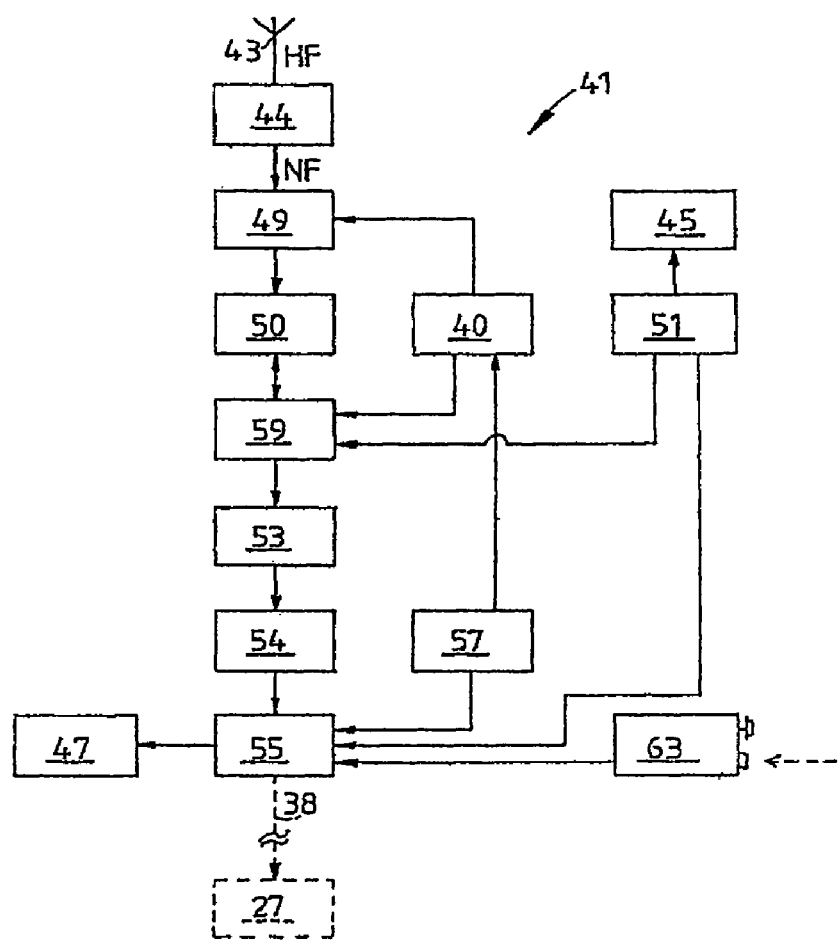
FIG. 3 an exemplary embodiment of a personal apparatus.

The personal apparatus 41 (FIG. 3) will preferably be used to reduce the data quantity in a clocked fashion using the signal of a clock generator 40 and preferably compress the data. The data compression serves additionally to protect the data of the person wearing or carrying the apparatus. It is virtually impossible for the data to be read out by unauthorized persons. From the number of recorded signal packets it is then readily possible to determine how long the respective person has been present in a transmission area of a device. Using the same clock for all personal apparatuses also permits more precise and simple coincidence formation in the control center using a clock generator 39 which operates in the same clock there.

It may however, be advantageous if the clock frequency is designed so as to be capable of being switched over. There are in fact devices which fulfill this purpose if they act only briefly on a person who is located in an influence area. In this case, the respective device will emit a signal which causes the clock generator to switch over in the personal apparatus. The clock generator switches back automatically if the transmission area is exited.

The arrangement can, as previously described, be operated independently of the clock time, in which case the signals are just stored in succession. However, an assignment to the clock time will preferably be made. The clock time can also influence the coincidence routine. The time at which a device had a strong or a weak acceptance level may also be important. If the time is also to be influenced, the personal apparatus will be preferably embodied as a wrist watch 41 which includes both the time display and the abovementioned functions. An antenna 43 of a receiver 44 which is of analogous design to the receivers 19a and 19b can then be accommodated in the watch casing, in which case this can preferably be composed of plastic, but does not necessarily have to be, or in the watch strap. The front side of the watch then has a time display 45 and, if desired, a further display 47 for, for example, readiness to receive or record a signal emitted by a transmitter unit 3a to 3c or 15 of one of the devices 1a to 1c. An (RF) signal which is transmitted in a wire-free fashion and received via the antenna 43 by means of the low frequency (LF) identification signal which is obtained by means of the receiver 44 is fed to an analog/digital converter 49. The conditioned LF signal is fed to a buffer 50 on which the clock generator 40 already mentioned above acts. The clock generator 40 is connected to the receiver 44 for the abovementioned switching over of the clock frequency. The analog/digital converter 49 is also connected to the clock generator 40. Through-connection of the now digitized LF signal is enabled in each case only by the clock generator 40. The enabling times of the clock generator 40 are determined according to the identification signals which are to be detected and processed later in the control center 27. The enabling times are in the second range and subsecond range. It is also possible to transmit data packets to below the microsecond range. The clock generator 40 is connected to a time generator 51, generally a vibrating quartz and its associated electronics. The time generator 51 also controls the time display 45. The time display can be set to the requirements of the person wearing or carrying the personal apparatus. The time generator 51 is preferably set in the control center to what is referred to as GPS time and then runs on very precisely under quartz control. The time to be displayed (but not the "internal time") can be adjusted by the person; there are, for example, persons who, in order to be punctual at all times, set the time to be displayed to 5 or 10 minutes "ahead". Since the clock generator 40 is connected to the time generator 51, a signal registration of the identification signals of the devices can always occur at a predefined time. Given knowledge of this predefined time it is possible to shorten the computational outlay on the formation of coincidences in the control center 27.

In the remaining registration-free time which is determined by the clock generator 40, data is read out of the buffer 50 and converted into a frequency spectrum in a Fourier transformation unit 53 which is connected to said buffer 50. The data of the frequency spectrum is compressed in a data compression unit 54 (for example Huffman encoding; Lempel-Ziv-Welch process etc.) and stored in a memory 55 which can be read out by the control center 27. If it is considered necessary, the compressed signal could be encrypted. It is not at all compulsory to carry out a Fourier transformation. Other methods, such as for example a wavelet transformation, could also be used. A preferred method for processing the digitized data is described in EP 0 598 682 A1 (Liechti AG).

It is possible to dispense with the analog/digital converter 49 if the electromagnetic identification signal which has been received with the antenna 43 is already present as a digital signal.

The method mentioned above functions however only if the person is also wearing or carrying the personal apparatus 41 and has not left it lying around somewhere. In order to determine the state of carrying or the times of day when the apparatus is carried, an element 57 which detects at least one bodily function is integrated into the personal apparatus 41. Sweat on the skin, body temperature, blood pressure, pulse etc. can be used as bodily functions; it is alternatively or additionally also possible to use a movement sensor (preferably with a ball of mercury). Preferably, when configuring the personal apparatus 41 the pulse will be measured since it does not permit any misinterpretation owing to ambient influences. Alternatively, in order to ensure that a result is unambiguous it is also possible to measure the temperature and movements simultaneously. The detected bodily functions can be stored in the memory 55. If no bodily functions are measured, the personal apparatus 41 is switched off in order to save energy.

The buffer 50 can have a comparator 59 connected downstream of it. The comparator is connected to the clock generator 40, the time generator 52 and the memory 55. The comparator 59 only allows a signal coming from the buffer 50 to pass if it differs from the preceding signal. If the signals differ, the last signal is stored, together with the time, after it passes through the components 53 and 54. This method is used to reduce the quantity of data stored in the memory 55.

In addition to the identification signal data contents transmitted by electromagnetic radiation it is also possible to store in particular acoustic ambient information. Conclusions about leisure time behavior can then be concluded from this.

Input means 63 can also be provided on the personal apparatus 41 which is preferably embodied as a wrist watch. The input means 63 are used to conduct a "dialog" with the respective device. It could be of interest, for example, to determine not only whether the person who is wearing the personal apparatus 41 and is located in the transmission range has perceived the device but also how the device acts on the person (positively, negatively, insignificantly, . . . ). The questions which are necessary for this can then be displayed on the display 47 on the personal apparatus 41.

However, the input means could also be used, when analyzing acceptance of newspapers and illustrative periodicals, to determine which articles are read with preference. In this case, the input means will tend to be similar to a keypad of a mobile phone with multiple assignment of the keys. It is then possible to input an articles code and a code for the interest level and an assessment. If there is a unit in the vicinity, it is then also possible to determine where (at home, on the train, . . . ) the respective article has been read.

Figure 4:
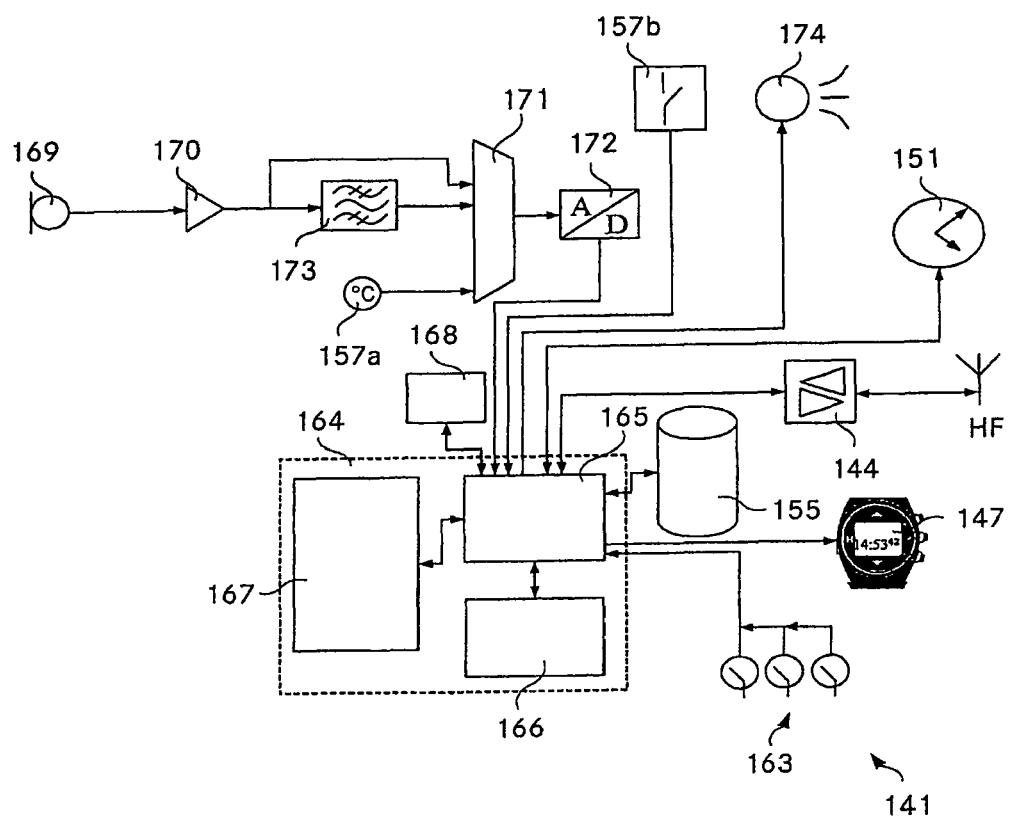
FIG. 4 a block diagram of a further exemplary embodiment of a personal apparatus.

FIG. 4 shows a block diagram of a further exemplary embodiment of a personal apparatus 141 according to the invention which is also accommodated in a wrist watch casing. The personal apparatus 141 in turn comprises a real-time clock 151 whose signal is used, on the one hand, to clock the operation of the personal apparatus 141 (reception of signals, storage in an apparatus memory 155 etc.) and, on the other hand, to control the time display on the LCD 147. The reception, the processing, the storage and the outputting of all the signals and information is controlled and partially performed by what is referred to as a "system-on-chip" processor 164. Said processor 164 is embodied as a hybrid controller with a MCU (micro-controller unit) 165 and a DSP (digital signal processor) 166 which are connected to one another internally. The DSP 166 is used in particular to compress (and thus encipher) the audio signals. Furthermore, the "system-on-chip" processor 164 comprises an internal memory 167 for temporarily storing data.

The personal apparatus 141 in turn comprises a RF receiver 144 which receives electromagnetic RF signals, in particular identification signals from transmitter units arranged on devices, by means of an antenna. The signals are conditioned by the RF receiver 144 (that is to say depending on the type of signal they are demodulated, decoded and/or A/D (analog/digital) converted) and transmitted via a microwire 1-wire interface to the "system-on-chip" processor 164. The received and conditioned identification signals are stored in the apparatus memory 155 (16 Mbytes Flash) with clocking by the time signal of the real-time clock 151 and under the control of the "system-on-chip" processor 164. An EMIFS interface (external memory interface slow) is provided between the "system-on-chip" processor 164 and the apparatus memory 155 as well as between the "system-on-chip" processor 164 and the LCD 147. In order to access the content of the apparatus memory 155 from the outside, an interface 168 is provided, said interface 168 being connected to the "system-on-chip" processor 164 and being controlled by it. Said interface 168 permits communication between the personal apparatus 141 and what is referred to as a docking station which can be provided for each user of the personal apparatus 141 or in a control center. In the case of the former, the user can, for example, read out the apparatus memory regularly via the docking station and transmit it automatically to the control center. This permits the most up to date data without the need for a backtransmission by the personal apparatus 141. In the case of the latter, the data in the control center is read out of the apparatus memory and the user does not need to be concerned with this step.

The personal apparatus 141 also has a microphone 169 and a corresponding preamplifier unit 170 whose signals are transmitted to a 14-bit analog/digital converter (ADC) 172 via an analog multiplexer/switch 171. A connectable filter 173 is also provided between the preamplifier unit 170 and the analog multiplexer/switch 171. Said filter 173 filters low-frequency components, which are required for the acceptance measurement of radio and television transmitters, from the sound signal. For other applications the filter 173 can be bypassed so that the entire frequency spectrum is available for further processing. The digital signal which is generated from the sound signal, or certain sections of it, are in turn stored in the apparatus memory 155 under the control of the "system-on-chip" processor 164. In addition, the temperature sensor 157a whose analog signal is also converted by the analog/digital converter 172 and further processed in the "system-on-chip" processor 164 is connected to the analog multiplexer/switch 171. Because the sound signal is usually required only in brief time periods (for example three periods of 4 seconds per minute) in order to permit coincidences to be formed later with stored time period device signals, the analog multiplexer/switch 171 is connected by the "system-on-chip" processor 164 to the microphone 169 via a MPUIO interface (microprocessor unit input/output) during this time, and the preamplifier unit 170 is connected to the temperature sensor 157a during the remaining time. In this way it is possible for an individual analog/digital converter 172 to process the signals of the two modules, and only a single interface (in turn a microwire 1-wire interface) is required for the "system-on-chip" processor 164.

The temperature sensor 157a serves (inter alia) for determining whether or not the personal apparatus 141 is being worn by a person. In order to improve the reliability of this determination, an inclination sensor 157b is also provided in the personal apparatus. Said inclination sensor 157b comprises a movable ball of mercury which performs electrical contact depending on the state of inclination. The closing or opening of the contact makes it possible to infer that the personal apparatus 141 is moving (or accelerating) and thus permits conclusions as to whether the apparatus is also being worn by the person (or at least carried). Finer analyses of the signal pattern of the inclination sensor 157b are also possible and these permit, for example, movement patterns which are atypical of a personal apparatus which is being worn on a person's wrist to be excluded. The signal of the inclination sensor 157b is transmitted for further processing to the "system-on-chip" processor 164 via a McBSP (multichannel buffered serial port).

The temperature sensor 157a (in addition to other indices) can also be used to determine whether the person is currently in a building or outside; it therefore permits certain conclusions to be drawn about the current location.

Input means 163, for example a plurality of pushbutton knobs are arranged on the personal apparatus 141 (see below). The signals which are generated by activating the input means 163 are transferred to the "system-on-chip" processor 164 via a MPUIO interface. The personal apparatus 141 finally comprises a buzzer 174 for generating signal tones, for example alarm signals, warning signals and notification signals for the user.

The "system-on-chip" processor 164 is capable of processing both the produced audio and RF data and the signals of the sensors 157a, 157b and of the input means 163 independently of one another and simultaneously, and of actuating the LCD display 147, the buzzer 174 and the interface 168. This ensures that the user can use all the functions of the personal apparatus 141 at all times; and that at all times he can, for example, register the use of print media or activate other manual actions.

FIG. 5 shows an external view of the personal apparatus 141. It is in the form of a wrist watch with the LCD display 147 already mentioned above, three side buttons 190, 191, 192 and two scroll activation buttons 193 and 194 (referred to as an equilateral triangle) which are arranged above and below the LCD display 147. The topmost of the side buttons 190 ("Cancel") serves generally for reversing or aborting actions. The center button of the buttons 191 ("Confirm") is used to make confirmations, and the bottom button of the buttons 192 ("Activate") has activation functions. The user prompting is also described in more detail below. The scroll activation buttons 193 and 194 which are embodied as film buttons or part of a touch-sensitive display ("touch screen") serve to scroll the displayed contents upwards and downwards, for example when the selection is made from a plurality of possibilities. In addition to the abovementioned functions, the input means 163 make available the functions which are customary with a wrist watch (setting of the time, the date, the alarm, stopwatch functions etc.). For example, by simultaneously pressing the buttons 190 and 192 ("Cancel" and "Activate") for five seconds the user can thus initiate the setting of the time and of the date.

The method of functioning of the determination of the acceptance level of print media will be explained in conjunction with the FIGS. 6A-M. The respective state of the LCD display 147 during various steps of the user prompting system is illustrated in the figures. Generally, the information about the input means 163, i.e. the buttons 190, 191 and 192 and the scroll activation buttons 193 and 194 is registered, said information being used to determine the acceptance level of print media. The user prompting is carried out by means of the LCD display 147.

So that the user does not forget to register his use of print media, i.e. the reading of newspapers or periodicals, he is regularly reminded, for example three times daily (for example at 10.30 am, 1.30 pm and 9 pm), specifically irrespective of whether the use of newspapers or periodicals has been already registered on this day. The reminder is given in a purely visual way because audible reminder signals could be disruptive for the user (for example if they occur during a conversation or a concert). For this purpose, as illustrated in FIG. 6A, a symbol for a newspaper together with a question mark is included on the display 147 for five minutes. The user can then either confirm that he wishes to register the reading of the newspaper by activating the button 192 ("Activate"), or he can specify, by pressing one of the other lateral buttons 190 and 191, that no reading is taking place at the moment. In this case, the system switches back to the normal display with the time and date. However, instead of the visual reminder it is also possible to use a silent vibrator.

Instead of including a symbol for a newspaper together with a question mark on the display 147 for five minutes, the display can also remain until it is operated. Instead of a visual reminder signal, which does not cause acoustic disruption, a silent vibration signal can also preferably be transmitted to the base of the personal apparatus 141.

The user can also start the registration of the use of print media himself at any other time. To do this, he presses the lowest lateral button 192 ("Activate") (illustrated in FIG. 6B) in the normal operating state of the personal device 141. In both cases, the selection of the registration of reading is confirmed by the display illustrated in FIG. 6C, which in turn shows the newspaper symbol and indicates that the reading of a newspaper ("Newspaper") is to be registered. If the user would then like to register the reading of a magazine, he presses on the button 192 ("Activate") again, after which it is newly specified that the reading of a magazine ("Magazine") is to be registered. Of course, further categories (books, subgroups of the aforesaid categories etc.) may be provided.

In the case illustrated, in which only newspapers and periodicals are differentiated, it is sufficient if the display illustrated in FIG. 6D remains for approximately 1 second and the system is then changed automatically into the periodical selection (see FIG. 6E), confirmation by the user does not need to occur. (The user will in any case press the "Activate" button 192 "blind" either once or twice, depending on the respective reading, after the first registration processes).

The selection of periodicals shows in each case three titles one below the other on three lines. The title display in the center can be selected in each case by pressing on the center lateral button 191 ("Confirm"). Pressing on the uppermost button 190 ("Cancel") causes the registration of the print media use to be aborted and the time and the date to be displayed again (see FIG. 5). If the user would then like to select a different periodical, in the example illustrated "Newsweek" which is on the first line, he can scroll in the illustrated list by pressing on one of the two scroll activation buttons 173, 174.

The list of selectable newspapers or periodicals is stored in advance in the apparatuses by the provider of the personal apparatuses 141. So that the user does not need to go through the entire selection (with possibly more than 100 titles) when selecting a title, a number of titles (preferably a maximum of 10) are characterized as "favorites". They always appear at the top of the selection list, while its sequence is changed randomly (or according to a predefined system) from one selection process to the next so that the result of the determinations cannot be falsified systematically by a fixed sequence. The favorites are defined before the actual use of the personal apparatus 141, said use being carried out, for example, on the basis of a questionnaire which the user had to fill in in advance (relating to the collection of data which is used for the later analysis) and on the basis of existing information (for example the native language and the place of residence of the user). The user has, for example, specified which titles he has subscriptions for and which he buys or reads regularly. If the favorites list is not yet full, newspapers or periodicals which the user has selected manually are also included in it during the use of the personal apparatus 141. The favorites list can also be organized as a ranking, i.e. as soon as one of the "nonfavorites" titles has been selected more frequently than the favorite used least, the new title moves forward into the favorites list and pushes out the former favorite.

In the case illustrated, the user firstly presses on the upper scroll button 193 in order to select the title so that a further periodical ("Gardening") is displayed at the top and the periodical "Newsweek" is displayed newly in the center line (see FIG. 6F). The user then confirms his selection by pressing on the central lateral button 191 ("Confirm").

The newspaper symbol (illustrated in FIG. 6G) together with "Edition" will now be displayed for a second in order to indicate to the user that the edition to be read will be selected next. After approximately one second, the selection illustrated in FIG. 6H will be presented. Similarly to the periodicals list, the user can then select the edition to be read by activating the scroll activation buttons 193 and 194 and the "Confirm" button 191. In the case shown, he can select between the current edition ("Actual"), the previous edition ("Previous") or another (earlier) edition ("Other"), such as is appropriate, for example, with publications which appear on a weekly or monthly basis.

As soon as the user has selected the edition, the current time appears again on the display 147, but in a representation which is changed compared to the normal operating state and has small numbers for the hours and superscripted large numbers for the minutes (see FIG. 6I). The seconds are not displayed. In addition, the newspaper symbol is displayed bottom right and the name of the selected newspaper or periodical appears at the top, that is to say "Newsweek" in the case illustrated. From this time on, the duration of the reading is registered. In this phase it is no longer possible to abort by pressing on the uppermost lateral button 190. Pressing on the bottommost button 192 or the confirmation buttons 193 and 194 also has no effect in this phase.

During the reading, the user is regularly reminded (for example the first time after 30 minutes and then every 15 minutes) that he should signal when he finishes reading. This reminder is given on the one hand by a five-second-long visual message "Still reading?" on the display 147 of the personal apparatus 141 (FIG. 6J), and on the other hand by an audible signal. The message "Still reading?" is to be considered merely an example. Instead of a single message, it is, of course, also possible to display a plurality of messages in chronological sequence. Other languages than particularly English can also be used.

Figure 6J:
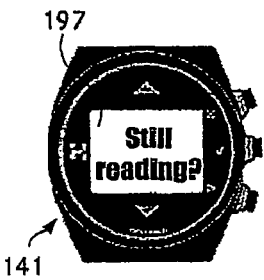
Figure 6K:
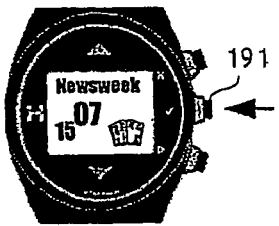
Figure 6L:
Figure 6M:

As soon as the user has finished reading (or has started reading another newspaper or periodical), he presses on the center button 191 ("Confirm"), see FIG. 6K. This can also occur independently of the reminder message. The registration process is then terminated, the determined data (title which has been read, edition, time, duration) is stored in the apparatus memory and the communication according to FIG. 6L is displayed to the user for three seconds. The personal apparatus then returns to the normal state and again shows the time (with seconds) and the data (FIG. 6M).

When the use of print media is registered with a personal apparatus according to the invention, all the steps illustrated do not need to be run through in each case. If, for example, the determination of the period of use is dispensed with, the registration process is terminated after the confirmation of the selected title (FIG. 6H). The registration of the edition (FIG. 6G, 6H) can also be omitted. If only a small number of titles are available for selection, the differentiation into "newspapers" and "periodicals" can also be dispensed with (FIGS. 6C, 6D).

However, there may also be additional steps so that, for example, it is possible to demand an additional selection in which the user can, for example, select, which part of a newspaper (politics, sport, culture, local news etc) he is to read.

Figure 7:
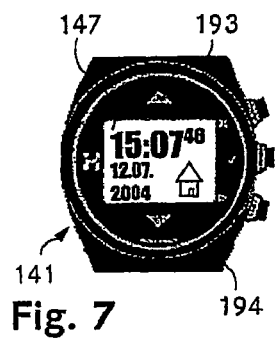
FIG. 7 the display of the personal apparatus when registering a location of use.

FIG. 7 shows the display 147 with the personal apparatus 141 when the location of use is registered. The location and the form in which the time and the date are displayed are matched in such a way that a free space in which a symbol assigned to the location can be displayed is provided in the right-hand lower region of the display. In the case shown, the display is a stylized little house which indicates to the user that "at home" is set as the current place of use. The user can adjust the location (the location code) manually by pressing on one of the scroll activation buttons 193 and 194. As a result, the available locations (or location categories) such as "at home", "on the way to work", "in the office", "in a restaurant" etc. can be scrolled through. The location code can also be changed automatically when the personal apparatus 141 receives the identification signal of a known device and can assign it to another location (or a different location category) than the currently set one. If a use of a device or of a medium is registered and stored in the apparatus memory, the current location is also stored simultaneously. This permits more detailed conclusions about the location of use during the evaluation of the registered data, for example whether radio is being listened to at work or a newspaper is being read on the way to work in a means of public transportation, and thus also whether there are differences in the use of various radio transmitters or newspaper titles at home and in the office or on the way to work. Furthermore, "optional" consumption (at home) can be differentiated from consumption "determined by third parties" (for example of radio transmissions in restaurants).

Figure 8:
FIG. 8 the display of the personal apparatus after the end of the registration time period for a person.

FIG. 8 shows the display 147 of the personal apparatus 141 after the end of the registration time period for a person. The transmission of the data stored in the personal apparatus 141 occurs most simply by sending back the personal apparatus 141 to the control center where the data is read out of the apparatus memory and evaluated. So that up-to-date evaluations are possible, the personal apparatus is issued to one respective person only during a specific period of time (a number of days to a number of weeks). After the end of this time period, the person is requested to return the personal apparatus 141 to the control center. The expiry of the time period is indicated to the person by the message "please send back" illustrated in FIG. 8. So that the person is not surprised by the message and suddenly no longer has any time or data information available, the message can at first be issued in alternation with the normal display of the personal apparatus 141 —or the time and the date continue to be displayed only for as long as the person presses on a defined button. The message is displayed permanently only after a certain time (for example after 24 hours). The sensing of the use of devices and media can be stopped automatically after the expiry of the predetermined time period.

In addition to a keypad, or even instead of one, a plug connection may also be provided. A further receiver for electromagnetic radiation can then be connected to this plug connection. This receiver can be used for the wire free transmission of further signals whose data content is stored in the memory 55. The data can then be stored directly or even after the compression described above. The compression can be performed in the personal apparatus or in a control center.

However there may also be what is referred to as a "docking station" in the apartment of a person carrying or wearing the personal apparatus. This "docking station" will then be connected to a control center, preferably via the telephone network. If a decentralized "docking station" is provided, it is possible to dispense with compressing the data in the personal apparatus since the data is transferred to the "docking station" on a virtually daily basis. The "docking station" can then perform compression if necessary.

It is then possible, for example, to use a bar code reader with which data is determined and then transferred in a wire free fashion. In this way it is also possible to register the listening habits of persons who listen with headsets and thus cannot be evaluated with the customary audible transmitter listening recordings. A small transmitter unit is connected to the headset socket, and the headset cable is in turn connected to said unit. The transmitter of this transmitter unit has a very short range. All that is necessary is to maintain a transmitting link to the personal apparatus ("wrist watch").

The input means can also be used to charge accumulators in the personal apparatus and to check the correct setting of a timer.

Instead of the personal apparatus being embodied as a wrist watch it is also possible to embody it as a piece of jewelry such as, for example, a brooch. It is also possible to embody it in the manner of an earpiece. If the personal apparatus is to be additionally used to record the acceptance levels of radio and television transmissions alone or together with the identification signals of the devices, it is possible to use an additional microphone whose data compression is performed in a way which is analogous to that of the electromagnetic signal. In order to maintain the hearing when a transmission is being listened to with headsets, a transmitter for a corresponding electromagnetic radiation could be included in the headset cable.

High frequency radiation in the gigahertz or subgigahertz range will be used as the electromagnetic radiation; however, it also possible to use visual radiation in the visible range or near the invisible range.

Each device has at least one device transmitter. It is possible for there to be a plurality of device transmitters in order, for example, to extend the transmission area spatially. It is also possible for there to be a plurality of transmitters which emit different identification signals. This may be advantageous if personal apparatuses which are specified for different groups of persons are issued.

Each device transmitter has a very high frequency component for emitting the carrier frequency (gigahertz, optical) and a low frequency component for the identification signal to be impressed on the carrier frequency. The identification signal can then be a data sequence which is programmable but fixed over a relatively long time period; however, it can also be a continuously changing data sequence.

The invention claimed is:

1. A method for determining an acceptance of devices comprising;
    transmitting an electromagnetic identification signal with a data content and with a transmission range defining a predetermined coverage by each device; and
    receiving and storing the current data content by a personal apparatus carried by a person,
    wherein the transmission range of the device and a receiving sensitivity of the personal apparatus are configured to each other where no more data is received if the device is located outside a typical human attention or perception zone relative to the personal apparatus carried by the person,
    wherein, by means of a timer in the personal apparatus, an amount of data in an apparatus memory is reduced and/or chronological assignment is carried out and/or it is determined how often and/or how long the person carrying the personal apparatus has been located within the respective transmission range of the device,
    wherein within the framework of the method, the timer is temporarily switched over in a clock sequence by a device signal to change a clock frequency for receiving and storing the data content and to adjust the clock frequency to typical durations of the person carrying the personal apparatus within the transmission range of the respective device in response to the device signal.

2. The method as claimed in claim 1, wherein further information is stored in the apparatus memory by input means on the personal apparatus.

3. The method as claimed in claim 2, wherein the storage by the input means is executed in accordance with the received data content of the identification signal from one of the devices.

4. The method as claimed in claim 2, wherein the storage by the input means is independent of the reception of the data content of the electromagnetic identification signal from one of the devices and occurs simultaneously with the reception of the data content.

5. The method as claimed in one of claims 2 to 4, wherein at least one of the following pieces of information is recorded by the input means in the personal apparatus:
    a location of a use of a medium;
    a time and/or a duration of the use of the print medium;
    a qualitative indication of the use of the medium or of one of the devices.

6. The method as claimed in claim 1, wherein, in addition to data contents of identification signals transmitted by electromagnetic radiation, environmental information is also received and stored independently of the reception of the data contents of the identification signals, wherein the reception and the storage of the environmental information occurs simultaneously with the reception of the data contents of the identification signals.

7. The method as claimed in claim 1, wherein
    the signals from a plurality of devices within a spatial monitoring range and/or the environmental information during a period of time are stored in a processing center as a time period device signal;

data contents of the identification signals or environmental information stored in each apparatus memory during the period of time are subsequently transmitted to the processing center; and are read out to form coincidences with the time period device signals stored therein, and the detected coincidences are processed.

8. The method as claimed in claim 7, wherein at least one of the following pieces of information is determined from the coincidences formed with the stored environmental information:

a location of the use of a medium;
a time of the use of the medium;
a duration of the use of the medium.

9. The method as claimed in claim 2, wherein at least two of the following pieces of information received during the same period of time data content of the identification signal;

further information from the input means;
environmental information;
are stored together for simultaneously determining a location and/or a time and/or a duration of use and/or qualitative indications relating to the devices or media.

10. The method as claimed in claim 1, wherein the personal apparatus emits at predetermined time intervals, an electromagnetic initiation signal with a coverage corresponding to the typical human attention or perception zone.

11. The method as claimed in claim 1, wherein the data to be stored in the apparatus memory are stored together with a piece of time information, comprising a time of day and/or a date, and the time information occurs repetitively in the minute or subminute range with a signal duration in the second range or subsecond range.

12. A system implementing the method as claimed in claim 1 for determining an acceptance of locally spaced devices, including a transmitter unit which is configured on each device and which can emit electromagnetic identification signal identifying this device and with a transmission range defining a predetermined coverage, and a plurality of personal apparatuses which are carried by a respective person and which are provided with a receiver for the signals and with an apparatus memory in which data contents of the emitted signals are stored for a predetermined period of time, wherein the coverage of each transmitter unit defines a respective transmission range and the transmission range and a receiving sensitivity of the receiver are configured to each other where no more data is received if the device is located outside a typical human attention or perception zone relative with respect to the personal apparatus, and each personal apparatus has a timer for reducing an amount of data in the apparatus memory and/or for carrying out chronological assignment and/or for determining how often and/or how long the person carrying the personal apparatus has been located within the respective transmission range of one of the devices, wherein the timer is temporarily switched over in a clock sequence by a device signal to change a clock frequency for receiving and storing the data content and to adjust the clock frequency to typical durations of the person carrying the personal apparatus within the transmission range of the respective device in response to the device signal.

13. A personal apparatus for a system as claimed in claim 12, wherein the apparatus is formed as a wrist watch casing, and contains at least the following electronic components:

at least one receiver for electromagnetic radiation;
an apparatus memory for storing data sets which are received by each receiver;
a timer for reducing an amount of data in the apparatus memory and/or carrying out chronological assignment and/or for determining how often and/or how long a person carrying the personal apparatus has been located within the respective transmission range of a device, and
an interface for reading out the stored data sets,
wherein the timer is temporarily switched over in a clock sequence by a device signal to change a clock frequency for receiving and storing the data content and to adjust the clock frequency to typical durations of the person carrying the personal apparatus within the transmission range of a respective device in response to the device signal.

14. The personal apparatus as claimed in claim 13, further including a synchronizable timer unit with which data sets received in cooperation with the apparatus memory are time-synchronously storable.

15. The personal apparatus as claimed in claim 13, further comprising a carrier sensor for determining the times at which the personal apparatus is not carried by the person, and comprising a temperature sensor and/or a movement sensor.

16. The personal apparatus as claimed in claim 13, further comprising input means for storing further information in the apparatus memory, wherein storage occurs simultaneously with and independently of the reception of the data content of the electromagnetic identification signal.

17. A transmitter unit for a system as claimed in claim 12, further comprising a transmitter for electromagnetic radiation with a transmission power which defines a predefined range, the range configured for reception only when in the range of human attention or perception, and a programmable memory which is connected to the transmitter unit and whose data contents are device-specific.

18. The method as claimed in claim 10, wherein the device or personal apparatus is initiated by an initiation signal for emission of the identification signal or its reception.

19. The personal apparatus as claimed in claim 13, further comprising a time display which is connected to the timer unit.

20. The personal apparatus according to claim 16, further comprising a display means on which instructions for the person carrying the personal apparatus and/or information relating to the current status of the personal apparatus is displayed.

* * * * *